(12) United States Patent (10) Patent No.: US 6,539,206 B1
Min et al. (45) Date of Patent: Mar. 25, 2003

(54) PILOT SIGNAL STRENGTH ADJUSTING METHOD IN MOBILE COMMUNICATION SYSTEM

(75) Inventors: Seung-Hyun Min, Kyonggi-do (KR); Dae-Goo Kang, Kyonggi-do (KR); Woo-Seok Koo, Seoul (KR)

(73) Assignee: Hyundai Electronics Ind. Co., Ltd., Kyonggi-Do (KR)

( * ) Notice: Subject to any disclaimer, the term of this patent is extended or adjusted under 35 U.S.C. 154(b) by 0 days.

(21) Appl. No.: 09/276,299

(22) Filed: Mar. 25, 1999

(30) Foreign Application Priority Data

Mar. 26, 1998 (KR) .............................. 98-10545

(51) Int. Cl.⁷ .............................................. H04B 17/00
(52) U.S. Cl. ...................... 455/67.1; 455/561; 455/436; 455/522; 370/331
(58) Field of Search ................................ 455/422, 423, 455/424, 432, 434, 435, 525, 522, 450–453, 24, 70, 560, 561, 67.1, 245.1–245.2, 436–444; 370/331–334, 341

(56) References Cited

U.S. PATENT DOCUMENTS

| | | | |
|---|---|---|---|
| 4,144,496 A | * 3/1979 | Cunningham et al. | 455/447 |
| 5,579,306 A | * 11/1996 | Dent | 370/50 |
| 5,666,356 A | * 9/1997 | Fleming et al. | 370/328 |
| 5,781,861 A | 7/1998 | Kang et al. | |
| 5,912,884 A | * 6/1999 | Park et al. | 370/331 |
| 5,936,577 A | * 8/1999 | Shoki et al. | 342/373 |
| 6,002,676 A | * 12/1999 | Fleming | 370/328 |

FOREIGN PATENT DOCUMENTS

| WO | WO 97/08909 | 3/1997 |
|---|---|---|
| WO | WO 98/32262 | 7/1998 |

\* cited by examiner

*Primary Examiner*—Edward F. Urban
*Assistant Examiner*—Charles Craver
(74) *Attorney, Agent, or Firm*—J. Harold Nissen; Myron Greenspan; Lackenbach Siegel

(57) ABSTRACT

A pilot signal strength adjusting method in mobile communication systems, in which strength of pilot signals generating in CPTU installed in base stations is automatically adjusted according to sum of calls which are allocated to reference frequencies of the base stations so that hard hand off to different frequencies is performed smoothly between adjacent base stations, wherein when a mobile station uses service coverage area of a base station which is installed with CPTU Common Pilot Transmit Unit, or calls of mobile stations are concentrated on a reference frequency of the base station which is installed with the CPTU Common Pilot Transmit Unit, strength of pilot signal is adjusted by increasing and/or decreasing power of CPCA installed in the CPTU by using the sum of calls allocated to a reference frequency of a base station installed with the CPTU, predetermined threshold values of set-up calls, predetermined user-units and predetermined power up/down values, so that the base station may smoothly perform hard handoff between frequencies through optimization of cell radius by adjusting pilot signal strength of CPCA Common Pilot Control Assembly, thereby maintaining high quality of telephone conversation service.

9 Claims, 3 Drawing Sheets

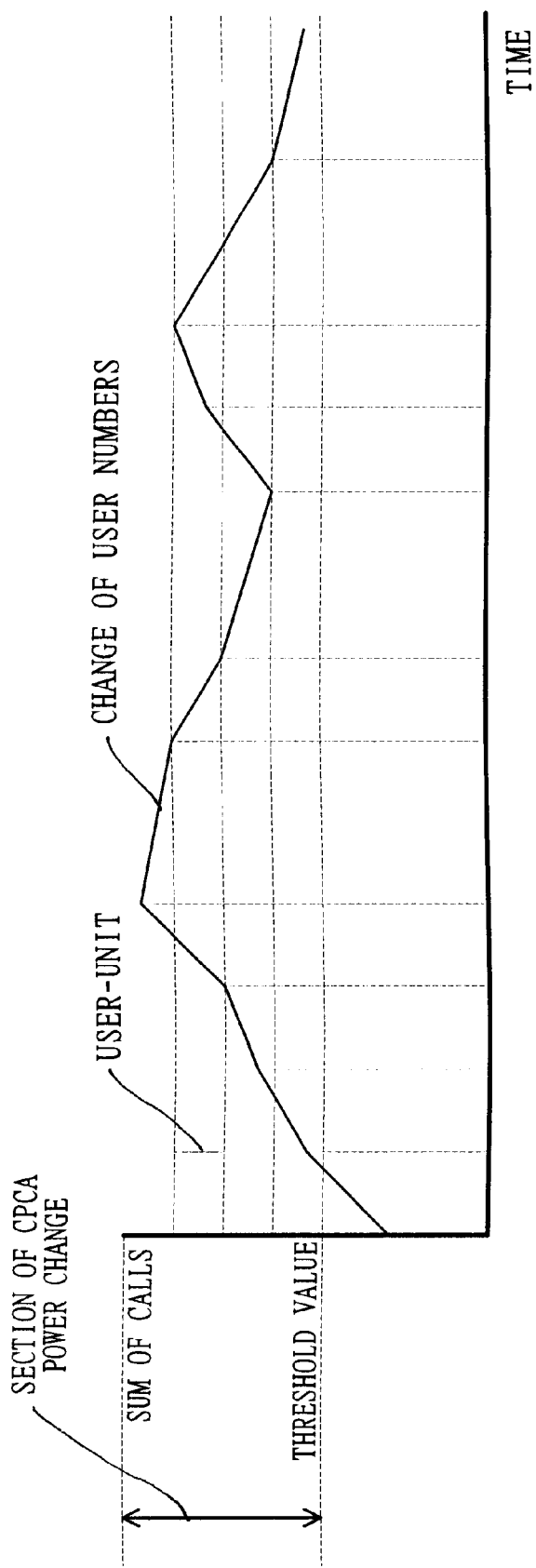

PILOT SIGNAL STRENGTH ADJUSTING METHOD IN MOBILE COMMUNICATION SYSTEM

BACKGROUND OF THE INVENTION

1. Field of the Invention

The present invention relates to pilot signal strength adjusting methods in mobile communication systems of digital cellular systems DCSs or personal communication services PCSs, in more particularly to, a pilot signal strength adjusting method in mobile communication systems, in which strength of pilot signals generating in common pilot transmit units (hereinafter, referred to "CPTU"), which are installed in base stations, is automatically adjustable according to numbers of total calls which are allocated to reference frequencies of the base stations so that hard hand off to different frequencies may be performed smoothly between adjacent base stations.

2. Description of the Conventional Art

In general, as shown in FIG. 1, a mobile communication system is composed of mobile station 10, base station 20, control station 30 and exchange station 40, in order to communicate with anybody, anytime and anywhere by means of radio frequency of space between mobile subscribers or between mobile subscribers and fixed subscribers. Particularly, in cellular mobile communications, total service area is divided into smaller service areas, that is, cells and wireless base stations are positioned. The base stations in the cells are centralized and controlled by the exchange station so that good quality of telephone communication may be continued even though subscribers are removing between the cells.

In the cellular mobile communication, one of the most important characteristics is assuring mobility of teleterminals of the subscribers and location registration and handoff techniques are required for assuring the mobility of the subscribers.

That is, the location registration is a procedure to inform base stations of various characteristics such as identification of current cellular nets positioned by the subscribers and states of the cellular nets. On the other hand, the handoff technique is a technique to switch communication paths between mobile stations and base stations in order to continue telephone conversation even though the mobile stations remove out of the current base station or service area of a current sector.

In the handoff techniques, soft handoff is performed between adjacent base stations, which utilizes a same frequency, and hard handoff is performed between base stations, which utilized different frequencies.

Conventional soft handoff and the hard handoff perform handoff to a same frequency of a same base station or a different frequency of a different base station, when strength of a pilot signal is lowered below a minimum value required to maintain a telephone conversation.

For example, if a mobile station using frequency f2 of base station A, which allocates frequencies f1 and f2, is removing toward base station B which allocates only frequency f1, then the mobile station detects that strength of a pilot signal of frequency f2 of base station A decreases below a threshold value and requests handoff. In response of this handoff request of the mobile station, base station B performs handoff from frequency f2 of base station A to frequency f1 of base station B, thereby forming a new telephone conversation path between the mobile station and base station B.

In the hard handoff system between different frequencies as above, however, base station B allocates only frequency f1, so that only pilot signals of frequency f1 exist and other pilot signals, that is, pilot signals of frequency f2 do not exist. Therefore, even though the mobile station enters into a service area of base station B, it is difficult for base station B to notice direction and extent that the mobile station removes.

Further, since handoff is forced to perform a different frequency of an adjacent base station if strength of a pilot signal of a base station is detected by a mobile station and determined to be lower than a predetermined threshold value by the mobile station, it is difficult to select a proper timing of handoff performance so that call drop occurs frequently. Furthermore, it is difficult to control electric power for the mobile stations since the mobile stations appear in adjacent base stations suddenly, thereby degrading performance of whole system.

Therefore, as shown in FIG. 1, CPTU Common Pilot Transmit Unit 23 is realized to generate separately pilot signals of which frequencies are not allocated by the base station 20. The mobile station 10 detects pilot signals that are generated by the CPTU 23 and performs hard handoff to different frequencies at an optimum timing in traffic and idle states.

At this time, the CPTU 23 is mounted in the base station 20 to perform hard handoff between frequencies and includes a CPCA Common Pilot Control Assembly 21 for controlling strength of common pilot signals and CPTA Common Pilot Transmission Assembly 22 for transmitting common pilot signals toward mobile stations.

That is, in case that a mobile station, which is using frequency f2 among frequencies f1 and f2 which are allocated by base station A, removes toward base station B, which allocates only frequency f2 and generates only f2 pilot signals through CPTU 23, the mobile station detects that strength of f2 pilot signals of base station A is lowered than a threshold value and strength of f2 pilot signal of base station B is higher than the threshold value. The mobile station requests handoff to f2 frequency of base station B, however no sources to handoff toward f2 frequency exist in base station B. Therefore, handoff toward the available f1 frequency of base station B is requested again and hard handoff from f2 frequency of base station A toward f1 frequency of base station B is performed.

The conventional hard handoff as above is successively performed when a cell radius of a common pilot frequency generated at the CPCA 21 in the CPTU 23 is smaller than or equal to a cell radius of a reference frequency of base station. Therefore, the conventional hard handoff is employed in base stations under the state that a cell radius is adjusted by fixing strength of pilot signal of the CPCA 21 equal to or smaller than strength of a reference strength.

However, under the situation that the strength of pilot signal of the CPCA 21 is fixed, if numbers of subscribers, that is telephone conversations are concentrated on the reference frequency of a base station, a cell radius of the reference frequency of the base station becomes smaller than a cell radius of a pilot frequency of CPCA 21. Therefore, due to the change of cell radius of the reference frequency of the base station, a probability that handoff between frequencies apt to be failed increases and telephone conversation of mobile station is apt to be cut, thereby it is impossible to provide continuous conversation service.

In order to resolve the problems of the prior art, strength of pilot signal of CPCA 21 is arbitrarily adjusted in such a manner that the strength is lowered for a time period on which calls are concentrated and recovered for an initial cell radius for a time period on which calls are not concentrated.

However, this has still problems that concentration of calls are continuously watched and adjustment of pilot signal strength of CPCA 21 is manually and complicatedly carried out, thereby accurate adjustment of cell radius of CPCA 21 is rarely achieved.

SUMMARY OF THE INVENTION

The present invention is derived to resolve the disadvantages of the conventional techniques and it is an object of the present invention to provide a pilot signal strength adjusting method in a mobile communication system, in which hard handoff may be performed between frequencies regardless of cell radius change of the reference frequency of the base station and that of the pilot signal frequency of CPCA by automatically adjusting strength of pilot signal by increasing and/or decreasing strength of pilot signal of CPTU Common Pilot Transmit Unit by using a sum of calls allocated to a reference frequency of a base station which is installed with the CPTU Common Pilot Transmit Unit, predetermined threshold values of set-up calls, predetermined user-units and predetermined power up/down values, so that continuous telephone conversation of mobile stations may be achieved.

In order to achieve the above objects of the present invention, according to an aspect of the present invention, a pilot signal strength adjusting method in mobile communication system is characterized in that when a mobile station uses service coverage area of a base station which is installed with CPTU Common Pilot Transmit Unit, or calls of mobile stations are concentrated on a reference frequency of the base station which is installed with the CPTU Common Pilot Transmit Unit, strength of pilot signal is adjusted by increasing and/or decreasing power of CPCA Common Pilot Control Assembly which is installed in the CPTU Common Pilot Transmit Unit by using a sum of calls allocated to a reference frequency of a base station which is installed with the CPTU Common Pilot Transmit Unit, predetermined threshold values of set-up calls, predetermined user-units and predetermined power up/down values.

In order to achieve the above objects of the present invention, according to another aspect of the present invention, a pilot signal strength adjusting method in mobile communication system, includes a first step of checking a sum of calls which are allocated to a current reference frequency of a base station if a mobile station is requesting a call set-up to or call release from the reference frequency of the base station, and determining whether the checked sum of calls is larger than a threshold number of set-up calls, a second step of determining whether the call set-up or call release has been performed by a user-unit if the checked sum of calls is determined to be larger than the threshold number of set-up calls, a third step of reducing pilot signal strength by reducing power of CPCA as much as a predetermined power up/down value if the call set-up is determined to have been performed by the user-unit, and a fourth step of increasing pilot signal strength by increasing power of the CPCA Common Pilot Control Assembly as much as the predetermined power up/down value if the call release is determined to have been performed by the user-unit, and repeating from the first step to third step.

BRIEF DESCRIPTION OF THE DRAWINGS

The present invention will become more fully understood from the detailed description given hereinbelow accompanying drawings which are given by way of illustration only, and thus are not limitative of the present invention, and wherein:

FIG. 3 is a graph showing power change of CPCA Common Pilot Control Assembly in case where a pilot signal strength adjusting method in a mobile communication system, according to an embodiment of the present invention is employed.

DETAILED DESCRIPTION OF THE INVENTION

A pilot signal strength adjusting method in a mobile communication system, according to an embodiment of the present invention will now be explained with reference to the accompanying drawings.

Figure 1:
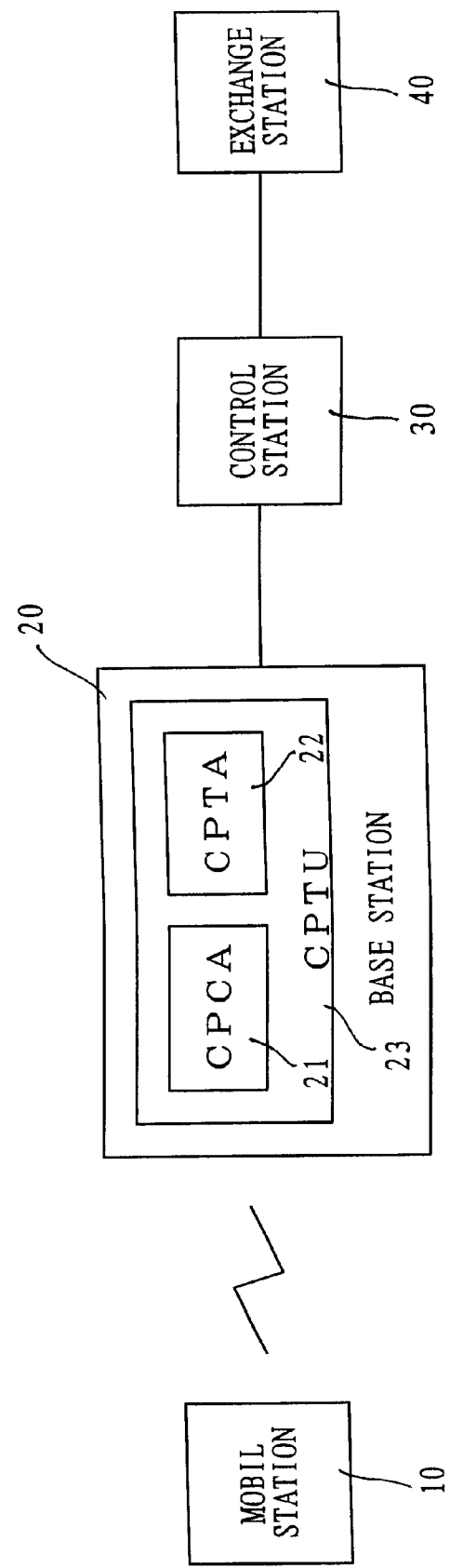
FIG. 1 is a schematic block diagram showing a mobile communication system in which a pilot signal strength adjusting method according to an embodiment of the present invention is employed.
Figure 2:
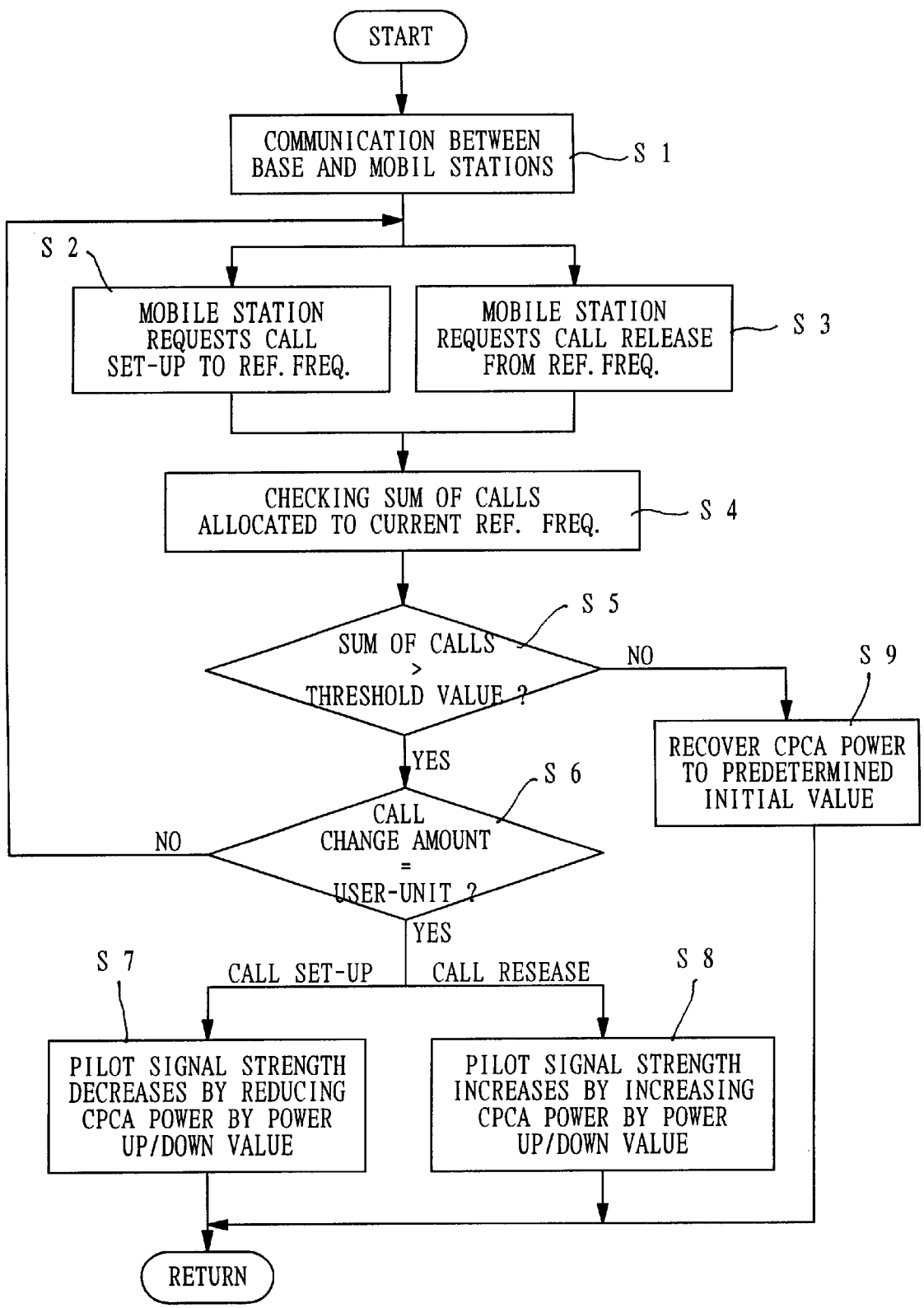
FIG. 2 is a flow chart for explaining a pilot signal strength adjusting method in a mobile communication system, according to an embodiment of the present invention.

FIG. 2 is a flow chart for explaining a pilot signal strength adjusting method in a mobile communication system, according to an embodiment of the present invention.

In FIG. 2, a pilot signal strength adjusting method in a mobile communication system according to an embodiment of the present invention includes a first step of checking a sum of calls which are allocated to a current reference frequency of a base station (S4) if a mobile station is requesting a call set-up to (S2) or call release (S3) from the reference frequency of the base station while communicating between a mobile station and a base station which is installed with CPTU Common Pilot Transmit Unit (S1), and determining whether the checked sum of calls is larger than a threshold number of set-up calls (S5), a second step of determining whether the call set-up or call release has been performed by a user-unit (S6) if the checked sum of calls is determined to be larger than the threshold number of set-up calls, a third step of reducing pilot signal strength by reducing power of CPCA as much as a predetermined power up/down value (S7) if the call set-up is determined to have been performed by the user-unit, and repeating from the first step to the second step, a fourth step of increasing pilot signal strength by increasing power of the CPCA Common Pilot Control Assembly as much as the predetermined power up/down value (S8) if the call release is determined to have been performed by the user-unit, and repeating from the first step to third step, and a fifth step of recovering the power of the CPCA Common Pilot Control Assembly to its predetermined initial value (S9) if the sum of calls which are set up to the reference frequency of the base station in the first step.

As described hereinabove, according to a preferred embodiment of the present invention, the adjustment of pilot signal strength of CPCA Common Pilot Control Assembly 21 is based on the situations of call set-up and call release of a mobile station from and to a reference frequency of the base station, wherein amount of increasing or decreasing of pilot signal strength to be adjusted is set on the basis of increased or decreased amount of calls which are allocated to the reference frequency of the base station.

Now, a pilot signal strength adjusting method in a mobile communication system according to an embodiment of the present invention will be described with reference to FIG. 3 in more detail.

While communicating between a base station 20 which is installed with CPTU Common Pilot Transmit Unit and a mobile station 10 of which calls are allocated to a reference frequency of this base station 20 (step S1), if the mobile station 10 is requesting a call set-up to the reference frequency of the base station 20 (step S2) or call release from the reference frequency of the base station 20 (step S3), the reference frequency of the base station 20 is checked (step S4) and it is determined whether the checked sum of calls is larger than a threshold number of set-up calls (step S5).

As a result of the determination in step S5, if the checked sum of calls is determined to be larger than the threshold number of set-up calls,, that is, if lots of calls are set up to the reference frequency, it is determined whether the call set-up or call release has been performed by a user-unit (step S6).

As a result of the determination in step S6, if the call set-up or the call release is determined not to have been performed by the user-unit, then it is repeatedly performed from step S1 to-step S5. On the other hand, if the call set-up or the call release is determined to have been performed by the user-unit in step S6, pilot signal strength is reduced by reducing power of CPCA Common Pilot Control Assembly as much as a predetermined power up/down value (step S7), and it is repeated from step S2 to step S6.

While repeated performance of procedures from step S1 to step S8, the power of the CPCA Common Pilot Control Assembly is recovered to its predetermined initial value (step S9) if the sum of calls is determined to be smaller than or equal to the threshold number of set-up calls in step S5.

Now, if it is assumed that threshold value of set-up calls is 50, power up/down value is 5, and user-unit is 5, then the pilot signal strength adjusting method in a mobile communication system according to the present invention is as follow.

First, during communicating between the base station 20 which is installed with CPTU Common Pilot Transmit Unit and the mobile station 10 (step S1), if the mobile station 10 is requesting a call set-up to the reference frequency of the base station 20, the base station 20 checks the sum of calls which are allocated to a current reference frequency in step S4.

At this time, if the number of the total calls which is checked in step S4 is 40, that is, the checked sum of calls 40 is determined to be smaller than the threshold number of set-up calls 50, the base station 20 resets the power of CPCA Common Pilot Control Assembly 21 to its initial value and repeats the routine from step S1 to step S4.

If the sum of calls which is allocated to the current reference frequency increases from 40 to 52 in step S4, steps S1 to S4 are repeatedly performed and no change occurs in the power of CPCA Common Pilot Control Assembly 21, since the increased total number 52 is larger than the threshold value 50 but the changed amount 12 of the call set-up value is not coincide with the user-unit of 5.

Further, if the sum of calls which is allocated to the current reference frequency increases from 57 to 60 in step S4, steps S1 to S4 are repeatedly performed and pilot signal strength of the CPCA Common Pilot Control Assembly 21 is reduced, since conditions of step S5 and step S6 are all satisfied with as well as the changed power of the CPCA Common Pilot Control Assembly 21 is coincide with the power up/down value of 5 which is preset in step S7.

Further, if the sum of calls which is allocated to the current reference frequency decreases from 60 to 55 in step S4, the power of the CPCA Common Pilot Control Assembly 21 is reduced by the power up/down value of 5 which is preset in step S8, since the conditions of step S5 and step S6 are all satisfied with.

As described hereinabove, during adjusting the pilot signal strength of the CPCA Common Pilot Control Assembly 21 by automatic increase/decrease of the power of the CPCA Common Pilot Control Assembly 21 through step S1 to step S8, the power of the CPCA Common Pilot Control Assembly is recovered to its predetermined initial value in step S9, if the sum of calls is determined to be smaller than or equal to the threshold number of set-up calls in step S5.

Now, referring to FIG. 3, power of CPCA begins to change by the user-unit when the sum of calls is larger than the predetermined threshold value of set-up calls. Further, power of the CPCA Common Pilot Control Assembly is recovered to its predetermined initial value if the sum of calls is determined to be smaller than or equal to the threshold number of set-up calls.

As described hereinabove, a base station which is installed with CPTU Common Pilot Transmit Unit hard may perform handoff between frequencies independently from cell radius, even though lots of calls are set up to a reference frequency of the base station, by automatically controlling pilot signal strength as much as increase/decrease amount of pilot signal in response to change amount of calls on the basis of a predetermined threshold value of set-up calls.

Effect of the Invention

Therefore, according to the present invention, even though a mobile station removes into a service area of a base station, which is installed with CPTU common pilot transmit units, or calls of mobile stations are concentrated onto a frequency of the base station, which is installed with CPTU common pilot transmit units, the base station may smoothly perform hard handoff between frequencies through optimization of cell radius by adjusting pilot signal strength of CPCA Common Pilot Control Assembly, thereby maintaining high quality of telephone conversation service.

What is claimed is:

1. A pilot signal strength adjusting method in a mobile communication system comprising the steps of:

checking total number of calls allocated to a current reference frequency of a base station which is installed with a CPTU Common Pilot Transmit Unit, or calls of mobile stations concentrated on a reference frequency of the base station which is installed with the CPTU Common Pilot Transmit Unit, and comparing the total number of calls to a predetermined threshold value of set-up calls when either a call set-up or a call release is requested by the mobile station;

adjusting strength of a pilot signal by increasing and/or decreasing power of a CPCA Common Pilot Control Assembly installed in the CPTU Common Pilot Transmit Unit; and using a total number of calls which are located to reference frequencies of the base station so that hard handoff to different frequencies may be performed smoothly between adjacent base stations, if the call release is performed by the user unit basis.

2. The method according to claim 1, including increasing power of the CPCA Common Pilot Control Assembly by the subscribers unit if a total number of calls allocated to a current reference frequency is larger than the threshold value of the set-up calls, and the mobile station requests call set-up to the reference frequency of the base station.

3. The method according to claim 1, including decreasing the power of the CPCA Common Pilot Control Assembly by the user-unit if the total number of calls allocated to a current reference frequency is larger than the threshold value of the set-up calls, and the mobile station requests a call release from the reference frequency of the base station.

4. The method according to claim 1, returning the power of the CPCA Common Pilot Control Assembly to its initial set-up value unit when a total number of calls does not exceed the threshold value of the set-up calls.

5. The method according to claim 1, wherein the power up/down value is set up to a variable value in response to a change of the number of the users in a user-unit.

6. A pilot signal strength adjusting method in a mobile communication system, comprising:

(a) checking a total number of calls allocated to a current reference frequency of a base station;

(b) comparing the total number of calls allocated to the current reference frequency of the base station to a predetermined threshold value of set-up calls when a mobile station requests a call set-up or a call release using the reference frequency of the base station;

(c) if the total number of calls exceed the predetermined threshold value of set-up calls, determining whether the call set-up or the call release is performed by a user-unit;

(d) decrementing pilot signal strength by decreasing power of CPCA Common Pilot Control Assembly by a predetermined power up/down value if the call set-up is performed by the user-unit; and (e) incrementing pilot signal strength by increasing power of the CPCA Common Pilot Control Assembly by the predetermined power up/down value if the call release performed by the user-unit basis.

7. The method according to claim 6, further comprising recovering the power of the CPCA to its predetermined initial value if the total number of calls allocated to the current reference frequency of the base station is not greater than the predetermined threshold value of set-up calls.

8. The method according to claim 6, further comprising repeating steps (a)–(d) if the call release is not performed by the user-unit basis in step (c).

9. The method according to claim 6, wherein the power up/down value in the steps (d) and (e) is set up to a variable value in response to a change of the number of the users in a user-unit.

* * * * *